Oct. 10, 1967  T. B. O'CONNELL ETAL  3,346,360
APPARATUS FOR HEAT TREATING AND CONVEYING
GLASS SHEETS VERTICALLY ORIENTED
Filed May 6, 1964

Thomas B. O'Connell, INVENTORS
Gordon G. Pierce, Richard A. Herrington
BY and Donald E. Shamp Nobbe & Swope
ATTORNEYS United States Patent Office 3,346,360
Patented Oct. 10, 1967

3,346,360
APPARATUS FOR HEAT TREATING AND CONVEYING GLASS SHEETS VERTICALLY ORIENTED
Thomas B. O'Connell, Gordon G. Pierce, and Richard A. Herrington, Toledo, and Donald E. Shamp, Millbury, Ohio, assignors to Libbey-Owens-Ford Glass Company, Toledo, Ohio, a corporation of Ohio
Filed May 6, 1964, Ser. No. 365,274
4 Claims. (Cl. 65—273)

This invention relates to heat treating glass sheets and more particularly to a new and improved method and apparatus for tempering sheets of glass.

It is a generally accepted commercial practice to subject sheets of glass to heat treating processes to modify the mechanical strength of the glass as well as the breaking characteristics of the glass. One such process, known as tempering, involves heating the sheets to approximately the softening point of glass and then chilling the sheet to place the outer surfaces or "skin" of the sheet under compressive stress and the interior of the sheet under tensive stress. This treatment not only materially increases the mechanical strength of the glass rendering it more resistant to damage due to impact, but also the treatment modifies the breaking characteristics of the glass whereby when broken the sheet disintegrates into small, relatively harmless particles rather than into the large, dangerous pieces or slivers resulting from the breakage of untempered glass sheets.

Due to their superior physical characteristics, tempered glass sheets of the above-described character are widely used as glazing closures, particularly as windows for vehicles of various types. When used for this purpose, it is important that the major surfaces of the sheets, that is, those surfaces lying within the viewing area of the finished window, be relatively free of any defects which would tend to interfere with clear vision through the window. Since the tempering process requires that the glass be heated to a temperature approximating its softening point, the sheets are rendered quite susceptible to being scratched, scuffed, nicked or otherwise marred by any physical contact with the apparatus employed in the process.

The primary aim of the invention is to effectively chill heated glass sheets by directing streams of cooling gases at relatively low pressures against the opposite surfaces of the sheet.

Another object of the invention is to provide a method and apparatus for tempering glass sheets while completely avoiding physical contact with the major surfaces of the sheets.

Still another object is to accomplish the foregoing by using the streams of cooling gases to float or balance the glass sheets on one edge during a portion of the tempering process.

The invention also resides in novel construction of blast heads utilizing a plurality of closely spaced tubes for directing the cooling gases toward the sheet in a number of comparatively small streams thereby promoting effective flow of the gases across the surfaces and free escape of the gases away from the surfaces.

Other objects and advantages of the invention will become more apparent during the course of the following description when taken in connection with the accompanying drawings.

In the drawings, wherein like numerals are employed to designate like parts throughout the same:

Figure 1:
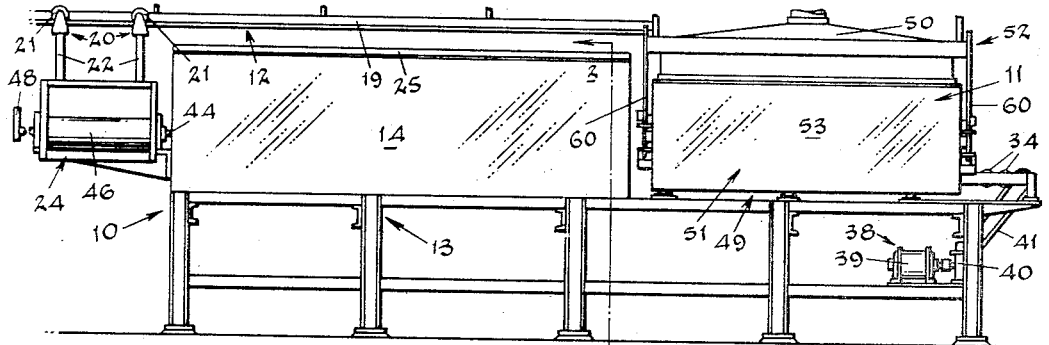
FIG. 1 is a side elevation of a tempering apparatus embodying the novel features of the present invention.

In the commercial production of tempered glass sheets, the latter are heated and subsequently chilled in a substantially continuous procedure. To this end, the sheets are moved one by one along a path through a heating area, wherein the sheets are heated to the elevated temperature necessary for tempering, and are thereafter immediately passed into and through a chilling area wherein the sheets are quenched to reduce their temperature at a sufficiently rapid rate to produce the desired stresses in the glass.

For purposes of illustration, the novel features of the present invention are shown in the drawings incorporated in apparatus of a type particularly adapted for use in the production of tempered glass sheets by the continuous process described above. This apparatus includes a furnace 10 and a cooling means 11 disposed end to end along a path together with a conveyor system 12 for moving the sheets S along the path through the furnace and past the cooling means. The various elements making up the apparatus are carried by a support frame 13 disposed along a path.

In the illustrated embodiment, a tunnel-type furnace 10 is utilized which includes side walls 14, a bottom wall 15 and a top wall 16 defining an elongated heating chamber 17. The chamber 17 may be heated in any desired manner by suitable heating means such as electrical resistance heaters 18 extending along and fixed to the opposed side walls 14 of the furnace 10.

Figures 2, 3:
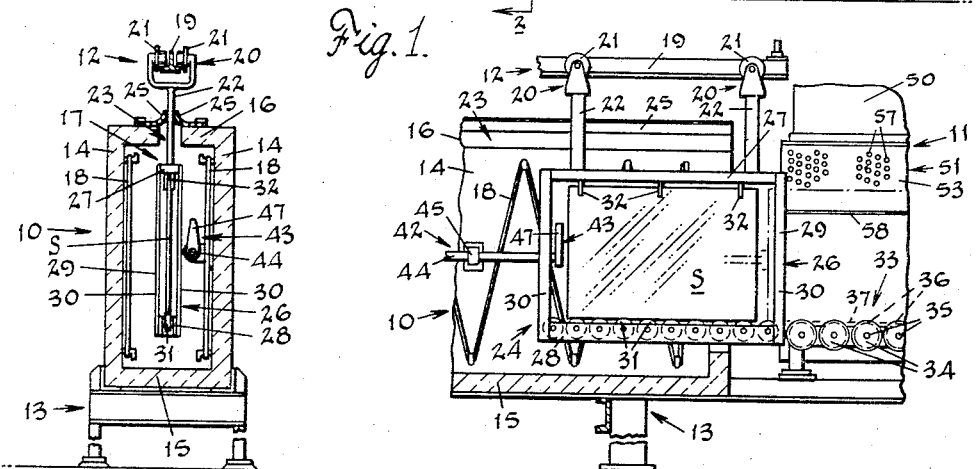
FIG. 2 is a sectional view taken along line 2—2 in FIG. 1.
FIG. 3 is a fragmentary sectional view showing a portion of the apparatus.

The sheets are carried through the furnace 10 on an overhead monorail 19 extending along the path through the heating area and forming a part of the over-all conveyor system 12. A carriage 20 is supported on the monorail 19 by wheels 21 to roll therealong and includes a link member 22 depending from the monorail through a slot 23 in the top wall 16 of the furnace and extending into the heating chamber 17. A rack 24 adapted to receive a glass sheet is fixed to the lowermost end of the link. As shown in FIG. 3, two such carriages 20 are utilized to support the rack 24. Flexible sealing members 25 are fixed to the top wall of the furnace to overlie and seal the slot 23, which members are adapted to yield to permit the movement of the links along the slot.

The rack 24 comprises a rectangular frame member 26 having top and bottom rails 27 and 28 disposed longitudinally of the path with their opposite ends joined by end rails 29. The end rails 29 comprise spaced bars 30 fixed at their opposite ends to the top and bottom rails 27 and 28 to permit the passage of the sheet therebetween. The sheet rests on rollers 31 journaled on the bottom rail 28 to turn about parallel axes extending transversely of the path. Clip means 32 depend from the top rail 27 to grip the upper edge of the sheet to support the latter on the rollers 31 in a substantially vertical plane.

It will be appreciated that in keeping with the aims of the invention, physical contact between the sheet support means and the major surfaces of the glass sheet is avoided during the heating phase of the tempering process.

Upon being heated during their passage through the furnace 10, the sheets S are moved directly into the chilling area and past the cooling means 11 which reduces their temperature to a point below the annealing range of glass. The cooling means are disposed adjacent opposite sides of the path of movement of the sheets and are operable to direct cooling gases, preferably air, against the opposite surfaces of the sheet.

In order to avoid marring the major surfaces of the glass sheets S during the cooling phase of the process, the present invention contemplates complete elimination of any physical contact with these surfaces by balancing the sheet on one edge between cushions of air created by the cooling means. Thus it is contemplated that the cooling air will perform two functions; that of supporting the glass sheet and that of reducing its temperature.

The sheets are carried between the cooling means 11 by a conveyor 33 extending along the path and completing the conveyor system 12. Herein, the conveyor 33 comprises a plurality of rollers 34 fixed to shafts 35 journaled on the frame 13 to rotate about parallel axes extending transverely of the path. The outer peripheries of the rollers 34 are provided with outwardly opening grooves 36 to guide the lower edge of the sheets along the path. The rollers 34 are coupled together to rotate in unison through the medium of a drive chain 37 entrained around sprockets (not shown) carried by each of the shafts 35 and are driven by a suitable power source 38 including a motor 39 and a speed reducing unit 40 mounted on the frame 13 below the path and coupled to the conveyor 33 through the medium of a belt drive means 41.

After the sheets S have been heated to the desired temperature and upon reaching the exit end of the furnace 10, the movement of the carriage 20 along the monorail 19 is stopped and the sheets shifted from the rack 24 onto the conveyor 33 by transfer means 42 operable to move the sheet over the rollers 34 on the rack out of the heating area and into the cooling area. In the present instance, the transfer means 42 comprises a pusher element 43 movable back and forth along the path and operable to engage the trailing edge of the sheet and push it off of the rack 24 and onto the cooling conveyor 33. As shown in FIG. 3, the pusher element 43 is mounted on a rod 44 extending through the heating chamber 17 and slidably received in brackets 45 carried by a side wall 14 of the furnace. The rod 44 is slid endwise back and forth in the brackets by a suitable pneumatic or hydraulic linear actuator 46.

The pusher element 43 is selectively movable between an operative position wherein it is disposed in the plane of the path and operable to engage the trailing edge of sheet and an out-of-the-way position permitting the rack 24 and the sheet carried thereon to move therepast along the path. To this end, the pusher element 43 comprises an elongated plate 47 with one end fixed to the end of the rod 44. Rotation of the rod, accomplished by means of a handle 48 fixed to an extension of the rod projecting outwardly from the linear actuator 46, swings the pusher between the operative and the out-of-the-way positions.

The cooling means 11 in the illustrated embodiment of the apparatus, comprises so-called blast heads 49 including air chambers disposed on opposite sides of the path in the chilling area and connected to a plenum chamber 50 disposed above the path, which plenum chamber is, in turn, connected to a source of air under pressure (not shown). Herein, the air chambers are defined by elongated, generally rectangular, housings 51 extending along opposite sides of the conveyor 33 and carried by frame members 52. The housings 51 include side walls 53 extending longitudinally of the path, end walls 54, a top wall 55 and a bottom wall 56. The opposed side walls 53 of each housing 51 facing the path are provided with a plurality of apertures 57 permitting pressurized air introduced into the housings 51 from the plenum chamber 50 to escape outwardly toward the path. The apertured side walls 53 are usually arranged parallel to each other and to the plane in which the sheet is to be carried through the chilling area. The air escaping from the apertures impinges upon the opposite surfaces of the glass sheet to cool the sheet and to create an air cushion to support the sheet in a generally vertical plane with its lower edge resting on the conveyor 33.

To insure against the sheet coming into contact with the side walls 53 of the housing 51 should a malfunction of the air supply system cause an imbalance in the pressure of the air in the opposed housings, thin wires or cables 58 are provided at opposite sides of the path adjacent the upper edge of the sheet. It will be appreciated, however, that in normal operation, the sheet will not contact these wires.

The degree to which the glass is tempered, that is, the magnitude of the stresses imparted to the glass, is dependent upon, among other things, the rate at which the temperature of the sheet is reduced. Generally speaking, the greater the rate of cooling, the greater will be the magnitude of these stresses imparted. The rate of cooling of the glass depends upon the ability of the cooling air to absorb heat from the glass and to carry this heat away from the glass. To perform this function efficiently, the air must flow freely across the surface of the sheet and then readily escape to allow unheated air from the blast heads to reach the sheet.

It has been found that ofttimes the heated air adjacent the surface of the sheet tends to remain adjacent the surface thereby forming a barrier preventing the fresh, cool air from reaching the sheet surface unless relatively high air pressures are used. The present invention, in another of its aspects, contemplates a blast head structure which enables air at a comparatively low pressure to efficiently flow across the surfaces of the sheet at a relatively high velocity and to readily escape away from these surfaces to permit new air to reach the surfaces. In general, this is accomplished by providing the opposed side walls 53 with a plurality of tubes 59 projecting laterally outwardly from the side walls toward the path with their outer ends terminating in a common plane. The air flowing through these tubes 59 from the blast heads 49 strikes the glass in a number of comparatively small streams and flows outwardly in all directions from the point of impingement to sweep the surface of the sheet and thereafter readily escapes between the tubes to permit a continuous low pressure air flow through the tubes.

It has been found that tubes ranging from 0.314 to 0.400 I.D. with a length of 3 to 6 inches provide a satisfactory air flow. With this structure, the glass may be satisfactorily tempered utilizing blast head pressures between 4 inches of water column and 29 inches of water column, depending upon the size and thickness of the glass sheets being tempered.

Figures 4, 5, 6, 7:
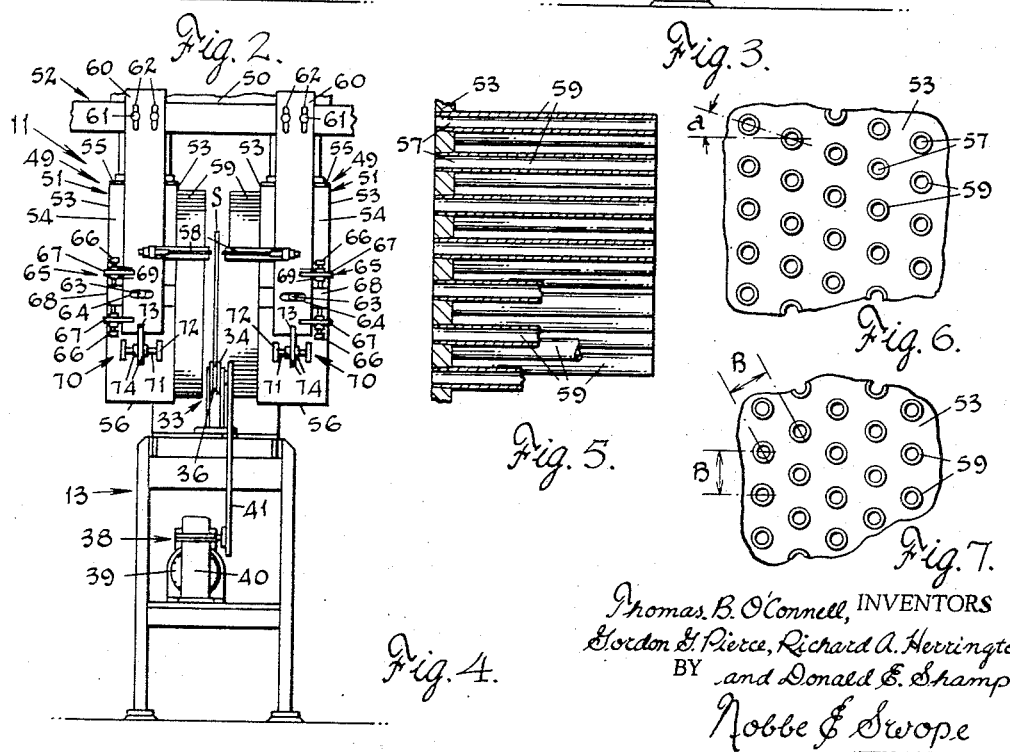
FIG. 4 is an end elevation of the apparatus.
FIG. 5 is a fragmentary sectional view showing the portion of the blast heads.
FIGS. 6 and 7 are similar fragmentary views of the face of the blast heads showing modifications of the geometric arrangement of the tubes in the blast head.

To insure that the cooling air will flow across and absorb heat from all areas of the glass sheet, the tubes 59 are arranged on the side walls 53 of the housing 51 in vertical rows with the tubes in adjacent rows being staggered so as to provide an overlapping pattern. One such arrangement is illustrated in FIG. 6, wherein the vertical rows and the tubes in each vertical row are spaced apart a distance of 0.6 to 1 inch and in which the angle $a$ at which the tubes in adjacent rows are offset is between 17° and 20°. As will be evident from FIG. 6, a complete overlapping of air streams emitting from the tubes occurs every three vertical rows of tubes.

A modified spacing arrangement is shown in FIG. 7 wherein every vertical row overlaps the preceding row. With this arrangement, the tubes in each row are located on 0.6 to 1 inch centers and the tubes in adjacent rows, dimension B in FIG. 7, are also on 0.6 to 1 inch centers.

As best shown in FIG. 4, the tubes projecting outwardly from each of the opposed side walls terminate in a common plane adjacent the path. The sheet S is supported with its lower edge resting on the conveyor 33 in a plane intermediate the two common planes. In order to permit varying the plane in which the sheet is supported, each of the blast heads may be moved back and forth in a horizontal plane toward and away from the path, up and down in a vertical plane and, further, may be tilted about a substantially horizontal axis extending longitudinally of the path.

To this end, each of the housings 51 is attached to hanger plates 60 depending from the frame members 52 adjacent each of the end walls 54 of the housing. The upper end of each hanger plate 60 is attached to the frame member 52 by screws 61 projecting through vertical slots 62 in the hanger plate and threaded into the frame member. The slots 62 permit the housings 51 to be moved up and down in a substantially vertical plane relative to the path.

Each of the housings 51 is attached to the hanger plates through the medium of studs 63 projecting laterally outwardly from the end walls 54 and through slots 64 in the plates 60. The slots 64 extend transversely of the path thereby permitting the housing 51 to be shifted in a horizontal plane toward and away from the path.

In addition to the foregoing adjustments, the housing may be tilted relative to the path about the studs 63 as axes and locked in any desired position by adjustable means 65 acting between the plates 60 and the housing. The means 65 includes machine screws 66 projecting through lugs 67 carried by the plate 60 and bearing against opposite sides of a block 68 fixed to the wall 54 of the housing. With the housing 51 in the desired position, the screws 66 are threaded into the lugs 67 to bear against the block 68 and locked in this position by lock nuts 69 carried by the screws on opposite sides of the lugs.

To further aid in securing the housing 51 in any desired position, an adjustable locking device 70, acting between the lowermost end of each hanger plate 60 and the housing 51, is provided. This device comprises an elongated threaded rod 71 fixed by clips 72 to the wall 54 of the housing and projecting through a plate 73 depending from the hanger plate 60. Lock nuts 74 threaded onto the rod 71 clamp against opposite sides of the plate 73 to prevent relative movement of the housing relative to the hanger plate.

Briefly stated, in operation, a glass sheet S to be tempered is positioned on the rack 24 with its lower edge resting on the rollers 31 and its upper ends secured by the clips 32. The rack is then introduced into the heating chamber 17 of the furnace 10 and carried therealong on the monorail 19. In passing through the furnace, the sheets are heated to a temperature ranging between 1150° F. and 1250° F. Upon reaching the exit end of the furnace, the rack 24 is stopped and the pusher element 43 swung into its operative position by means of the handle 48 and moved along the path by the linear actuator 46 to engage the trailing end of the sheet and push it along the rollers 31 off of the rack 24 and onto the conveyor 33 in the chilling area. Upon entering the chilling area, the sheet moves between the streams of air flowing from the blast heads, which streams balance the sheet on the conveyor as it moves along the path through the chilling area. In passing through the chilling area, the temperature of the sheet is reduced to a point below the annealing point of glass or approximately 600° F.

It will be appreciated that the procedures described above provides for effective and efficient tempering with a minimum of contact with the major surfaces of the sheets. In the cooling phase of the operation, only the air utilized to cool the sheet contacts the surface of the sheet. This air performs the additional function of balancing the sheet on one edge as it moves through the chilling area.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

We claim:
1. In apparatus for heat treating flat sheets of glass as said sheets move along a horizontal path, means for supporting a glass sheet on edge in a vertical position while moving along said path, means for heating the glass sheet to an elevated temperature, means for cooling the heated glass sheet comprising a plurality of horizontally disposed tubes supported at opposite sides of said path and extending inwardly toward said path, the inner ends of said tubes at each side of the path being disposed in a common plane, with their outlets normal to the adjacent sheet surface, means supplying air under pressure to said tubes to flow therethrough toward said path and against the opposite surfaces of a glass sheet moving therealong to support said sheet in a vertical plane, and thin wires extending horizontally along opposite sides of said path adjacent the upper edge of the glass sheet and normally spaced from said sheet but sufficiently close thereto to be engaged by the sheet and to support the same in a substantially vertical position upon an imbalance in the pressure of the air directed against opposite surfaces of the sheet.

2. In apparatus for heat treating flat sheets of glass as defined in claim 1, in which the tubes at each side of the sheet are arranged in substantially vertical rows with the tubes in adjacent rows being staggered, the internal diameter of the tubes ranging from 0.314 to 0.400 with a length of from 3 to 6 inches, and in which the pressure of the air directed against the sheet is between 4 inches and 29 inches of water column.

3. In apparatus for heat treating flat sheets of glass as said sheets move along a horizontal path in a vertical position, a furnace having a heating chamber extending along a portion of said path, a glass supporting rack, a plurality of horizontally aligned conveyor rolls carried by said rack and supporting the glass sheet at its bottom edge, means carried by the rack and engaging the upper edge of the sheet, means for conveying said rack and glass sheet through said heating chamber, a cooling area also disposed along said path and contiguous to said heating chamber, a plurality of horizontally aligned conveyor rolls in said cooling area in substantial alignment with the conveyor rolls carried by said rack for receiving the bottom edge of the vertically disposed heated glass sheet therefrom, means for cooling the glass sheet including a plurality of tubes supported at opposite sides of said path in said cooling area and extending inwardly towards said path, the inner ends of said tubes at each side of the path being in a common plane, with the outlets of the tubes normal to the adjacent shet surface, and means suplying air under pressure to said tubes to flow therethrough toward said path and against the opposite surfaces of the glass sheet and transfer means for moving the glass sheet from the rollers on the rack onto the conveying rollers in the cooling area.

4. In apparatus for heat treating flat glass sheets as defined in claim 3, including transfer means engaging the rear edge of the heated glass sheet in the heating chamber to push said sheet forwardly from the conveyor rolls on the rack onto the conveyor rolls in the cooling area.

References Cited
UNITED STATES PATENTS 2,251,159 7/1941 Owen _____ 65—104
3,223,506 12/1965 Wheeler _____ 65—273

DONALL H. SYLVESTER, *Primary Examiner.*
A. D. KELLOGG, *Assistant Examiner.*